United States Patent [19]
Mizutani et al.
[11] Patent Number: 4,734,704
[45] Date of Patent: Mar. 29, 1988

[54] THERMAL RECORDING APPARATUS

[75] Inventors: Shigemitsu Mizutani, Kanagawa; Jun Yamaguchi, Shizuoka; Tadashi Miyakama, Kanagawa, all of Japan

[73] Assignee: Fuji Photo Film Co., Ltd., Kanagawa, Japan

[21] Appl. No.: 803,656

[22] Filed: Nov. 29, 1985

[30] Foreign Application Priority Data

| | | | |
|---|---|---|---|
| Nov. 30, 1984 | [JP] | Japan | 59-252890 |
| Mar. 19, 1985 | [JP] | Japan | 60-55077 |
| Apr. 1, 1985 | [JP] | Japan | 60-68857 |
| Apr. 1, 1985 | [JP] | Japan | 60-68858 |
| May 15, 1985 | [JP] | Japan | 60-103501 |

[51] Int. Cl.$^4$ .......................... G01D 15/10; G03C 5/16
[52] U.S. Cl. .................................. 346/76 PH; 346/46; 430/348
[58] Field of Search ...................... 346/76 PH, 1.1, 46; 430/348

[56] References Cited

U.S. PATENT DOCUMENTS 4,446,467 5/1984 Takiguchi et al. ............. 346/76 PH

*Primary Examiner*—E. A. Goldberg
*Assistant Examiner*—Gerald E. Preston
*Attorney, Agent, or Firm*—Wenderoth, Lind & Ponack

[57] ABSTRACT

The ink jet method and thermal copying method have been developed as the method of obtaining hard copies in colors from terminals of data systems such as a computer. The inventive thermal recording apparatus can produce copies of clear images without color blurs or mixtures on multi-color heat-sensitive recording materials having a color developing mechanism which allows color development in desired hues. This invention recording head is small in size and low in cost, achieving recording of clear images without color blur at a higher speed.

12 Claims, 29 Drawing Figures

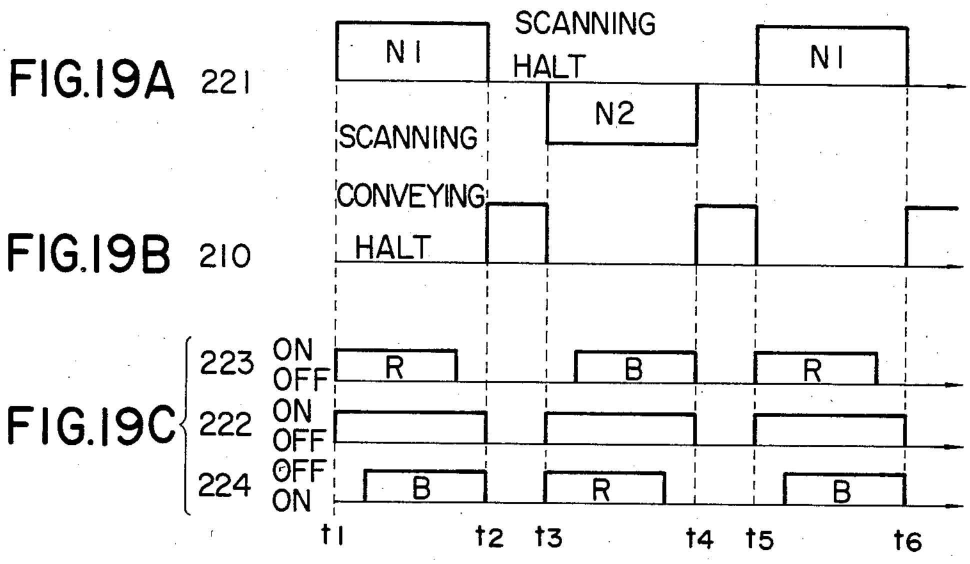
FIG. 20
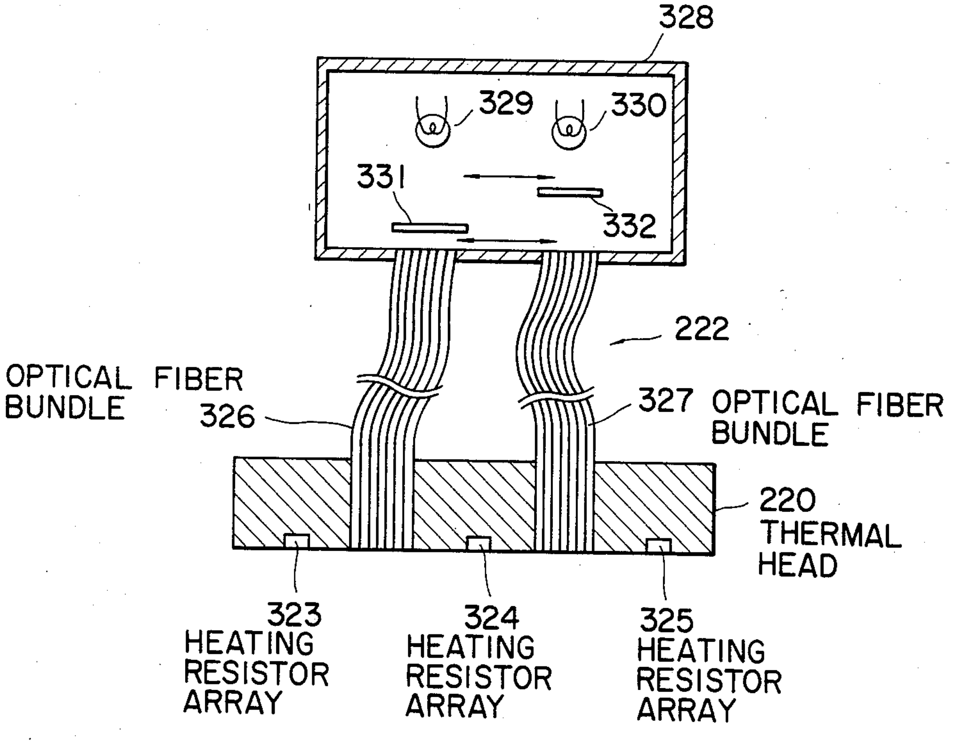

THERMAL RECORDING APPARATUS

BACKGROUND OF THE INVENTION

1. Field of the Invention

This invention relates to a thermal recording apparatus for heat-sensitive recording materials of multiple colors and more particularly, to a thermal recording apparatus for heat-sensitive recording materials which can produce record images of different hues (color images) with a higher certainty and speed by decomposing with light in a substantially selective manner at least one coloring component in a predetermined unit between one thermal recording and the next thermal recording and a thermal recording head therefor which is small in size and low in cost.

2. Description of the Prior Art

Along with the rapid and remarkable development in the information industry, there has been aroused a demand for a method which can simply produce hard copies in color from such terminals of information system as computers or facsimiles. There have been proposed an ink jet system and a thermal transfer system in the prior art, but they are detrimental in one way or other. As ink containing color dyes are jetted from a small nozzle in the ink jet system, dyes or other ingredients tend to clog the nozzle, thereby reducing reliability of the record. On the other hand, as the ink sheets are heated and melted to be transferred image-wise to a sheet of paper in the thermal transfer system, it is necessary to use four ink sheets for obtaining, for example, a four color image. As the system requires a large number of ink sheets, it presents an economic disadvantage. Moreover, both systems require constant attention of an operator; he should watch the process carefully so as to replenish ink or ink sheets in time. As a result, both systems force complex and troublesome procedures in maintenance.

On the other hand, the thermal color system has been known as an alternative system which requires no such troublesome maintenance procedures, is highly reliable and widely used in black-and-white facsimile terminals and printers in recent years. The system is simple in use as it employs characteristically a recording material which is coated with a layer having a coloring mechanism on a substrate. There has been felt a demand for application of the system in multiple color recording.

Application of the system in multi-color recording needs to incorporate coloring mechanisms in a number corresponding to the desired number of colors on a substrate and to control such coloring mechanisms respectively. Many efforts have been made but coloring control has not heretofore been satisfactory. For instance, Japanese Patent Publication No. 69/1974 discloses a recording material which uses in one heat-sensitive coloring layer two kinds of coloring components which present different hues at different temperatures. Japanese Patent Publication No. 11989/1976 and No. 133991/1977, and a Japanese Patent Laid-open No. 88135/1979 describe respectively recording material comprising high temperature heat-sensitive coloring layers and low temperature heat-sensitive coloring layers which are laminated consecutively on a substrate. Japanese Patent Publication No. 17866/1975 and No. 5791/1976 disclose a recording material which includes, in addition to the above mentioned high and low temperature thermal coloring layers, a decolorizer agent which has a decolorizing effect on the coloring component in the low temperature layer which corresponds to the imaged area of the high temperature layer when images are being formed. But these conventional multiple color heat-sensitive recording materials are not quite satisfactory because of difficultiies in one way or other.

For instance, when images of different hues are to be formed by the low- and high-temperature coloring methods by means of a recording material having one or two layers of thermal color developing, the tone of the images developed at high temperature tends to mix with that of the images developed at low temperature. The degree of mixture changes as the recording conditions such as temperature, humidity or type of printers change, presenting a problem in producing images with stable and constant color tones. Further, as an area of the temperature similar to that of temperature printing is generated in the periphery of the high temperature color development zone, the area around the high temperature images becomes the area which generates low temperature. These phenomena are generally called color run or a blur and present a factor detrimental to clear imaging. Although color mixing can be prevented in the recording material having a decolorizing mechanism, the problem of color run or blur still remain.

SUMMARY OF THE INVENTION

An object of this invention is to provide a thermal recording apparatus for multiple color developing type heat-sensitive recording materials having coloring mechanisms to effect desired colors, and to provide a recording apparatus for multiple color developing type heat-sensitive recording materials which can produce clear images without color blurs.

Another object of this invention is to provide a recording head which is small sized and inexpensive and yet capable of recording images on multiple color developing type heat-sensitive recording materials with a coloring mechanism of desired hues without causing color mixture.

Still another object of this invention is to provide a recording head which can produce clear images without color blurs at a high speed so as to enhance recording speed of the whole system.

According to this invention in one aspect thereof, for achieving the objects described above, there is provided a thermal recording apparatus for heat-sensitive recording material provided with plural types of thermal coloring elements comprising diazo compounds and coupling components on a substrate which is characterized by a structure comprising a conveyor means for said heat-sensitive recording material, thermal heads which activate and develop colors of said thermal coloring elements, and a light source to emit light for decomposing diazo compounds of said thermal coloring elements, and in that one thermal coloring element is subjected first to thermal recording with said thermal heads, and then to decomposition with the light from said light source, so that colors are respectively developed to obtain images in colors by repeating the aforementioned operations.

According to this invention in another aspect thereof, there is provided a thermal recording apparatus for heat-sensitive recording material provided with plural types of thermal coloring elements comprising diazo compounds and coupling components on a substrate which is characterized by the structure comprising a conveyor mechanism for conveying said heat-sensitive recording material, recording heads which are provided movably in the direction perpendicular to the conveying direction of said heat-sensitive recording material, and controlling means which controls said conveying mechanism, scanning mechanism and the recording operations by said recording heads, and in that colors are developed on said heat-sensitive recording material to obtain images in colors.

Further, according to this invention in still another aspect thereof, there is provided a thermal recording head comprising resistance heating member arrays arranged in parallel to each other on a substrate and slits provided between said arrays.

The nature, principle and utility of the invention will become more apparent from the following detailed description when read in conjunction with the accompanying drawings.

BRIEF DESCRIPTION OF THE DRAWINGS

In the accompanying drawings:

FIGS. 19A through 19C are timing charts to show examples of the operation of this invention; and FIG. 20 is a view to show still another embodiment of the thermal head used for this invention.

DESCRIPTION OF THE PREFERRED EMBODIMENTS

Figure 1A:
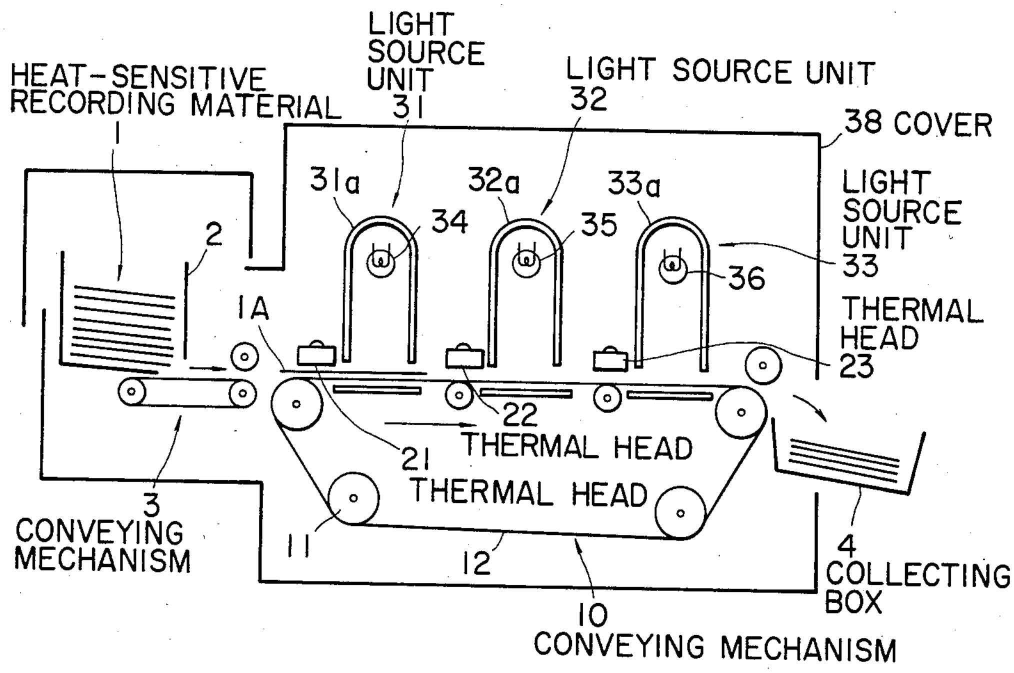
FIG. 1A is a side structural view of an embodiment of this invention.

Heat-sensitive recording materials which are to be used in this invention will be described first.

The heat-sensitive recording material has a plurality of unit groups (thermal coloring elements) $G_1$, $G_2$, . . . $G_n$ (n is an integer of 2 or larger) which forms colors in different hues. Each unit group $G_i$ (i is an integer) develops a color on the heat-sensitive recording material: The color is developed for the coupling group $G_1$ at a temperature which is higher than $T_1$ and lower than $T_2$. The heat-sensitive recording materials used are characterized in that;

(a) it comprises two or more than two types of compounds which can develop colors if heated at a specific temperature $T_i$°C. higher than the ambient temperature;

(b) color developing temperatures $T_i$ differ to meet the conditions below;

$$T_1<T_2<T_3 \ldots T \quad (2 \leqq l \leqq n)$$

(c) at least one of the above compounds is selectively decomposed with light containing a component of wavelength $\lambda_i$(nm) (200 nm$<\lambda_i<$700 nm) illustrated from outside;

(d) the compound(s) other than the above mentioned one which can be photo-decomposed may be compounds which belong to other unit groups.

The heat-sensitive recording material is then irradiated by the light containing the wavelength $\lambda_1$ content so that the photo-decomposable compound within the group $G_1$ is photo-decomposed for inhibiting the development of the color $G_1$. Then, the color of the group $G_2$ is developed at a temperature higher than $T_2$ and lower than $T_3$. The process of photo-decomposition and recording under controlled temperatures is repeated similarly to develop and record each color developing group separately, thereby producing multiple color images of desired hues.

The above mentioned method can develop colors of desired groups separately but sequentially. Using such features, this invention method can produce images is multiple colors without color mixtures or blurs.

The wavelength of the light used for selective photo-decomposition of the compound in the group $G_i$ is not necessarily the wavelength $\lambda_i$, and may be any wavelength so long as it does not decompose other compounds concurrently. Under specific conditions or for particular need, however, it may decompose other compounds simultaneously. The group which is the last to be color developed is not necessarily decomposed with light. For the second condition above (b), the temperature $T_1$ may be substantially the same temperature so long as it satisfies the following relation;

$$T_1=T_2= \ldots =T_l \quad (2 \leqq l \leqq n)$$

The multiple color heat-sensitive recording materials mentioned above are further described hereinbelow.

Each unit group basically comprises a diazo compound(s), a coupling agent and, if necessary, a basic substance or an acidic substance. The hue developed by a unit group is determined by a diazo dye obtained by reacting of the diazo compound(s) with a coupling agent. As is well known, the developed hue can therefore be changed simply by changing the chemical structure of either the diazo compound(s) or of the coupling agent. By selecting a suitable combination, any desired hue may be obtained substantially. Various diazo compounds may be dispersed in one layer and one coupling agent or other additives may be incorporated therein. In such a case, each of the unit group should comprise a diazo compound which is different from other groups, a common coupling agent and other additive(s). Alternatively, a coupler may be dispersed in a different layer while diazo compounds or additives may be contained in each layer. In such case, each coupling group comprises a coupling agent different from other groups, a common diazo compound(s) and other additives. In all the cases, each unit group comprises one or more diazo compound(s), one or more coupling agent(s) and other additives which are combined in a manner to develop different hues.

Description will now be given to the selective photo-decomposition of the heat-sensitive recording material.

The photo-decomposable compound herein means an aromatic diazo compound and more specifically, an aromatic diazonium salt, diazo sulfonate compound or diazoamino compound. For facilitating description, they are exemplified by an aromatic diazonium salt. The methods for selective photo-decomposition can be roughly classified into two types: i.e. (1) the method of changing the wavelength effective in photo-decomposition by varying the chemical structure of the diazonium salt used therein, and (2) the method of segmenting the light which reaches photo-decomposable compound with a filter within the group $G_i$. The former method (1) is widely known. The wavelength which can photo-decompose diazonium salt is generally deemed to be the absorption maximum wavelength. It is known that the absorption maximum wavelength of a diazonium salt changes depending on the chemical structure thereof in the range of 200 nm to 700 nm. More specifically, if diazonium salt is used as the photo-decomposable compound, it becomes decomposed by light of a specific wavelength corresponding to the chemical structure thereof. When the chemical structure of diazonium salt is changed, the hue of the dye obtained by the reaction with the same coupling agent changes conveniently. In the latter method, the upper layer may include a dispersion of diazonium salt(s) which becomes decomposed by the light of 400 nm to 430 nm, and dispersions of a coupling agent and an alkali, and the lower layer includes a filter layer having dispersed therein a light absorbing compound which blocks the light of 415 nm or lower. Another layer is provided underneath the lower layer in a manner that the coupling agent thereof alone is different from the upper layer and the developed hue thereof differs from that of the upper layer. Such heat-sensitive recording material is color developed first in the upper and lower layers. Then, it is exposed to light having the optical component of 415 nm or higher to photo-decompose the diazonium salt in the upper layer. The recording material is then subjected to thermal recording to develop colors in the lower layer, and then exposed to the light from the light source having the light content of 415 nm or less. The photo-decomposition may be conducted selectively either by providing a filter layer within the material or covering diazonium salt particles with a photo-filtering substance.

The methods for controlling temperature in color development are roughly classified into two: one is a method effective when the capsule wall is used. By changing the property of the wall, the temperature can be distinctly changed by varying permeability of the capsule wall. This method may be exemplified by a method such as using a capsule wall made of polyurethane, using a polyurea capsule wall, or changing the chemical structure of urea or urethane obtained by mixing polyurethane and polyurea. Another method may be one using multi-layered structure. A coloring agent is used to lower the coloring temperature, If the amount of such an agent is changed for each layer, temperature can be easily controlled.

Some of the components within a unit group of the heat-sensitive recording material may be applied as a solution or a dispersion. Alternatively, all the components may be applied in dispersed form. In such a case, ingredients are milled by a sand mill, a ball mill or a dyno mill to "solid dispersions". They may be micro-encapsulated with a water-insoluble organic solvent. Or some of the components may be used in dispersed form while others may be contained in a micro-capsule. The hard core of the micro-capsule and the substance outside of the capsule react when heated by passing through the capsule walls. The presence of an organic solvent is preferable as it can reduce fogging in storage remarkably while it can enhance coloring speed and density. The reason why the speed and density are enhanced is because the solvent expands the capsule wall when heated and accelerates permeation of reactants. The rate-determining stage in the reaction is mutual dissolution of reactants and if organic solvents are present, as the dissolving speed of the reactants is accelerated when heated, the coupling speed and density are increased. Especially when the diazo compound is contained in a micro-capsule, the fogging in color is effectively prevented in storage.

In the heat-sensitive recording materials to be used in this invention, it is preferable to either dissolve or disperse at least one of the reaction substances such as a diazo compound which is the core of the capsule, a coupling agent in an organic solvent, and then micro-encapsulate the core substance containing the reactant and the organic solvent with the wall substance obtained by such methods as interfacial polymerization, or external or internal polymerization. Materials for the wall are preferably polyurethane, polyurea, polyamide or polyester. The organic solvent used as the core substance is a water insoluble solvent of high boiling point. The boiling point is preferably 180° C. or higher. It may be carboxylates such as phosphate ester, phthalic ester and fatty amide, alkylated biphenyle. Co-solvent which is to be contained with the organic solvent of a high boiling point in the capsule may be halogenated alkyl compounds such as methylene chloride or dichloroethane or other ester compounds such as ethyle acetate and propyl acetate.

Diazo compounds which may be used in the thermal recording material are those which can react with a coupling component such as a diazonium salt expressed by the general formula $ArN_2^+X^-$, diazo sulfonate, diazo amino compound and which can be photo-decomposed.

Diazonium salts having different wavelengths for photo-decomposition are preferably used for this invention thermal recording material. Compounds having the wavelength around 400 nm are 4-diazo-1-dimethylaminobenzene, 4-diazo-1-diethylaminobenzene, 4-diazo-1-dipropylaminobenzene, etc. Compounds having the wavelength around 300 nm to 370 nm are 1-diazo-4-

(N,N-diocthylcarbamoyl) benzene, 1-diazo-2-octadecyl oxybenzene, etc. The photo-decomposing wavelength of the aromatic diazonium compounds can easily be changed in a wide range by arbitrarily changing substituents thereof.

The acidic anion may be $C_nF_{2n+1}COO^-$ (n is any number of 3 through 9) or $C_mF_{2m+1}SO_3^-$ (m is any number of 2 through 8).

The coupling component used in the present invention material couples with a diazo compound (a diazonium salt) in a basic atmosphere to form a dyestuff and may specifically be resorcin, phloroglucinol, 2- or 3-dihydroxynaphthalene-6-sodium sulfonate, etc. If two or more of these coupling components are used concurrently, images of desired hues can be obtained. The basic substance used for this invention material may be a basic substance of hydrophobic or water-insoluble property or a substance which is alkylated by heat. It may specifically be organic and inorganic anmonium salts, organic amine, amide, urea, tio urea, or their derivatives, thiazoles, pyrrole or other nitrogen compounds. The coupling agent is a substance which can increase the coupling density or lower the minimum coupling temperature at the time of heating/recording. It facilitates reaction between diazo, alkali and coupler by lowering the softening point of the capsule wall. Cocoupler may be a phenyl compound or an alcohol compound, and more specifically, P-t-octyl phenol, P-benzyloxyl phenol and P-oxyphenyl benzoate.

The micro-capsule used herein is prepared by emulsifying the core substance and forming a polymer wall around the oil drop. The reactant forming the polymer wall is added to inside and/or outside the oil drop. The polymer may be polyurethane, polyurea, polyamide, polyester, etc. It preferably has the melting point at a temperature higher than 50° C. or the temperature of thermal recording. Any of the components of the unit group such as diazo compound(s), the coupling agent and the basic substance may be contained in a micro-capsule independently or in combination with others. When two or more types of diazo compounds or basic compounds are used as coupling agents, they may be contained in one micro-capsule or different micro-capsules.

Micro-encapsulation is most effective when it is conducted by polymerization of reactants from the inside of an oil drop. More particularly, it can produce in a short time a capsule which is excellent in shelf-stability, and has a uniform particle diameter. For example, if polyurethane is used as the material for the capsule wall, multivalent isocyanate and a second substance which reacts therewith for forming the walls (such as polyol) are mixed in an oily solution, emulsified and dispersed, and then subjected to polymerization reaction on the oil drop surface by raising the temperature to form the micro-capsule wall. An agent of a low boiling point and a potent solubility may be used in the oily solution. A water-soluble polymer may be used for micro-encapsulation for preventing emulsification and agglutunation of emulsified substances.

Micro-encapsulation is most effective when it is conducted by polymerization of reactants from the inside of an oil drop. More particularly, it can produce in a short time a capsule which is excellent in shelf-stability, and has a uniform particle diameter. For example, if polyurethane is used as the material for the capsule wall, multivalent isocyanate and a second substance which reacts therewith for forming the walls (such as polyol) are mixed in an oily solution, emulsified and dispersed, and then subjected to polymerization reaction on the oil drop surface by raising the temperature to form the micro-capsule wall. An agent of a low boiling point and a potent solubility may be used in the oily solution. A water-soluble polymer may be used for micro-encapsulation for preventing emulsification and agglutunation of emulsified substances. This polymer may include a water-soluble anionic polymer, a nonionic polymer and an amphoteric polymer. The anionic polymer may be natural or synthetic and may have —COO— and —$SO_3$— groups. Synthetic polymer may be copolymer of maleic anhydride group (including hydrolysis product), polymer and copolymer of acrylic acid group (including methacrylic acid group), polymer and copolymer of vinyl benzene sulfonate group, or denatured polyvinyl alcohol of carboxyl group. These water-soluble polymers are used as 0.01 to 10 wt% aqueous solution. The particle diameter of a micro-capsule is adjusted to be less than 20μ. When the diameter exceeds 20μ, the image quality generally deteriorates. When heating the micro-capsule from the side of coated layer using a thermal head, the diameter is preferably less than 8μ so as to avoid blurs often caused by pressure. A micro-capsule may be prepared from an emulsion containing the material for the micro-capsule by more than 0.2 wt%. It is preferable to use for 1 part by weight of diazo compound, 0.1 to 10 parts by weight of the coupling component and 0.1 to 20 parts by weight of the basic substance. The organic solvent may be contained by 2 to 50 parts by weight or preferably by 5 to 25 parts by weight. It is preferable to apply 0.05 to 20 g/m$^2$ of the diazo compound. They may be dispersed in solid form by a sand mill, etc. if not capsulated. In such a case, each of them is dispersed separately in a water-soluble polymer solution. The water soluble polymer is preferably the water soluble polymer used for preparation of the micro-capsule. The concentration of the water soluble polymer is 2 to 30 wt%. The diazo compound, the coupling content, and the basic substance are respectively added to such water soluble polymer at 5 to 40 wt%. The particle size despersed is preferably less than 10μ.

Various compounds having light absorbing property at corresponding wavelengths may be used as the light filter layer. They should preferably be distributed as uniformly as possible within the filter layer. They may be present as needed in various polymers such as polyvinyl alcohl, or polyvinyl pyrrolidone. A light absorbing compound having anionic group may be fixed to a polymer having a cation group by ionic exchange, or a spectrum absorption compound having a cation group may be fixed to a polymer having an anion group. It may be a polymer having the light absorptive site as the main chain of the molecule or the pendant group thereof. Alternatively a compound having light absorbing property may be dissolved and emulsified in a water-insoluble oil and used as an emulsified dispersion. Or the emulsified and dispersed substance may be absorbed in polymer latex and then crushed to fine particules. Or a light absorbing compound may be dissolved in a water-miscible organic solvent, mixed in a polymer latex solution to be impregnated in polymer granules and used as a disperse solution after removing the organic solvent. Light absorbing compounds having absorbency for a desired wavelength may be arbitrarily selected from among the compounds of salicylic acid such as phenyl salicylate, benzophenone compounds such as aqueous polyester, benzotriazole compounds such as benzotriazole, or acridines compounds such as 9-aminoacridine. In the case of multilayer structure, the upper layer itself may be used as a filter layer utilizing the light absorbing property thereof.

In order to prevent sticking of the recording material on the thermal head or to enhance recordability thereon, pigments such as silica, barium sulfate, titanium oxide, alminum hydroxide, zinc oxide or calcium carbonate, and fine powders of styrene beads, or urea-melamine resin may be used. A metalic soap may also be used to prevent sticking. The amount of use of these substances is preferably 0.2 to 7 g/$m^2$.

Hot-melt substances may be used as the heat-sensitive recording material to raise the thermal recording density. They may be a substance which is solid at ordinary temperatures but becomes melted when heated with the thermal head to the melting point of 50° C. to 150° C. and which dissolves diazo compounds, coupling content or coupling agents. The substance may be dispersed in granule form of 0.1 to 10$\mu$ and is mixed in an amount of 0.2 to 7 g/$m^2$ of the solid. They may specifically be a fatty amide or N-substituted fatty amide.

The heat-sensitive recording material may have applied a suitable binder which may be various emulsions of polyvinyl alcohol or methyl cellulose. The amount may be 0.5 to 5 g/$m^2$ in solid.

In the aforementioned heat-sensitive recording material, at least one of the diazo compound(s), the coupling content, the basic substance and the coupling agent is either melted or dispersed in an organic solvent and then micro-encapsulated. The remaining reactants are mixed with the above solution dispersed with microcapsules either in the form of solid dispersion or aqueous solution to prepare a coating solution, the coating solution is applied on a film of paper or synthetic resin by means of a bar, blade or air-knife, and then dried to form a thermal layer containing 2.5 to 15 g/$m^2$ of solid. Alternatively, it may be a laminated type of a microcapsule layer containing reactants and an organic solvent and another layer containing other reactants. Paper is particularly preferable as the supporting member of the heat-sensitive recording material and may be coated with the solution prepared by dispersing pigments such as kaolin, talc, or alumina in synthetic resin latex such as polyvinyl alcohol, gelatin, caboxymethlcellulose, hydroxyethyl cellulose, hydroxypropyl cellulose. The heat-sensitive recording material may be provided with a magnetic material layer for magnetic recording on the reverse side or with a fixing type diazo thermal layer, or with a heat-sensitive recording layer of leuco type. It may also be coated with the same heat-sensitive recording material on both surfaces just like the diazo heat-sensitive paper of fixing type.

The aforementioned heat-sensitive recording material can be used as paper for facsimile printers or computers demanding high recording speed. Unlike paper for ordinary facsimile or printers, it should have an exposing zone for photo-decomposition. Various light sources may be used as the source for light decomposition so long as they emit light of desired wavelengths. For instance, it may be a flourescent lamp, a fluorescent lamp used for wet-type diazo copiers, a fluorescent lamp used for electrostatic photography, a xenon lamp, a xenon flash lamp, mercury lamps of low-, middle-, high- or extra high-pressure, a photographic flash lamp, a strobe, a halogen lamp, an electro-luminescence cell or a cold cathode discharge tube. The light source section and the light exposing section may be connected by means of optical fibers to make the light fixing zone compact. The heat-sensitive recording material may be printed either in single color or multiple colors. The paper of this material may be recorded by thermal transfer recording or ink jet method. The material may be used as tickets, labels, season train tickets, securities, hand outs, horse race tickets, post cards, postal stamps, envelops, etc.

Figure 1B:
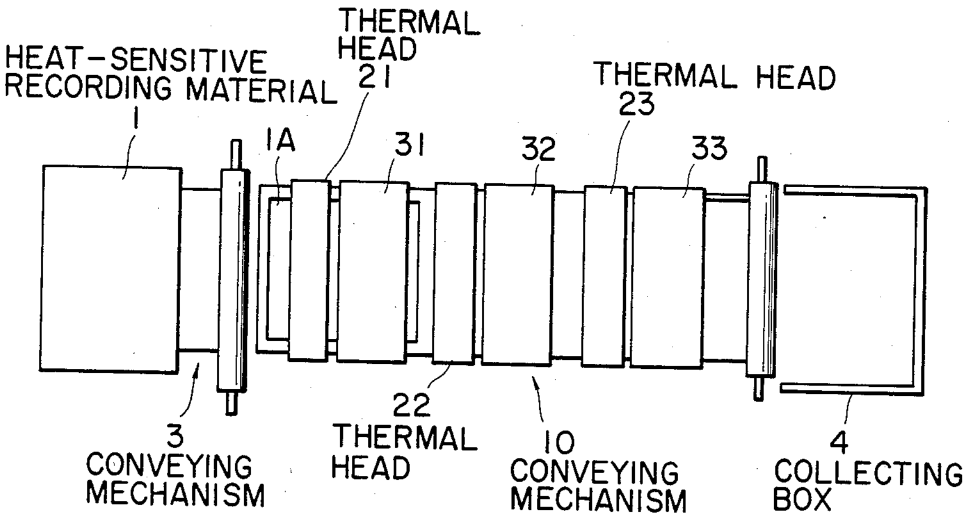
FIG. 1B is a plan structural view thereof.

Using the above described heat-sensitive recording materials, color images are recorded by means of a recording apparatus shown in FIGS. 1A and 1B. The heat-sensitive recording material 1 which is cut in a predetermined length in advance is stored in a pile in a stocker 2, is taken out from the bottom of the stocker 2 by a conveying mechanism 3 one sheet at a time, and transported to a recording section. The recording material 1A is conveyed to a collecting box 4 by a conveying mechanism 10 which comprises a belt 12 placed over plural rollers 11. On a horizontal section above the belt 12 of the conveying mechanism 10 are arranged thermal heads 21, 22 and 23 in a line to develop the colors or yellow (Y), magenta (M) and cyan (C). On the down stream side of the thermal heads 21 through 23 are respectively arranged light source units 31, 32 and 33 which emit light of different wavelengths for color separation. The light source units 31 through 33 include light sources 34, 35 and 36 which are housed in light blocking covers 31*a* through 33*a* having openings in the direction toward the recording paper and which emit light of a predetermined wavelength, respectively. The whole unit is sheathed with a cover 38 which blocks light in the ultraviolet zone so as to prevent the thermal coupling elements on the recording material 1 from being decomposed and lowering the sensitivity.

Figure 2:
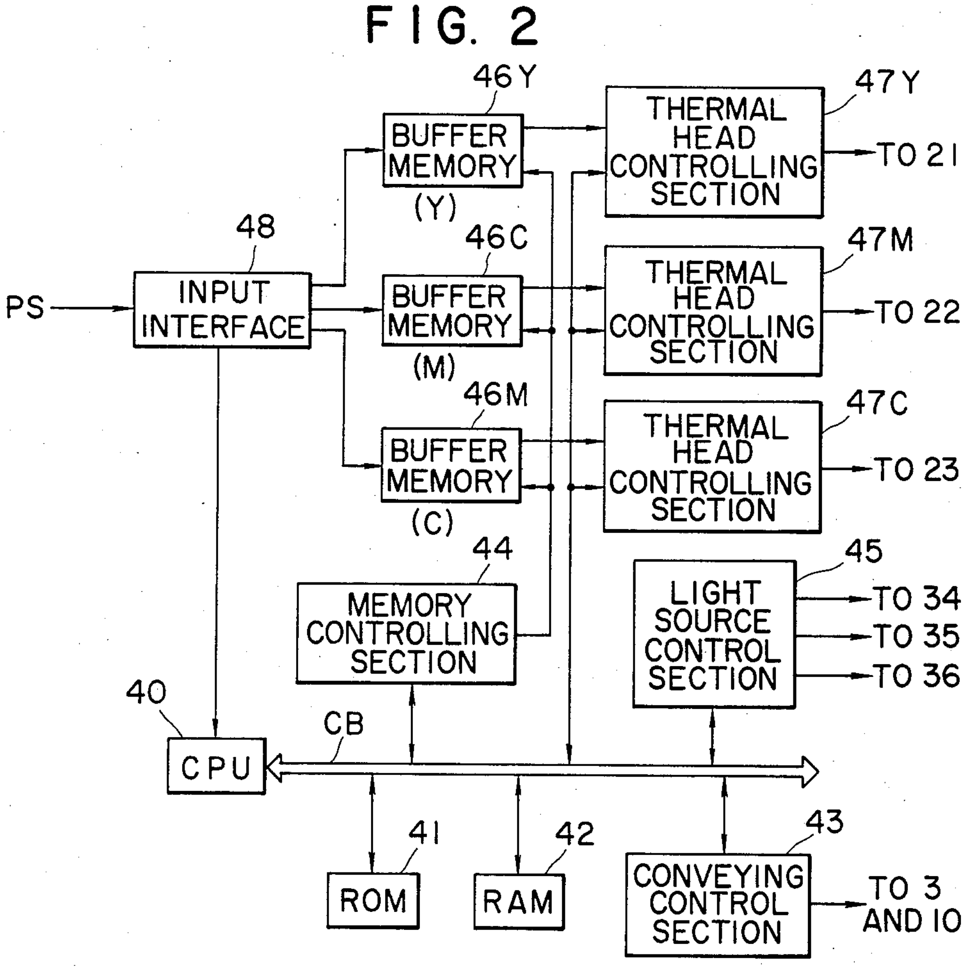
FIG. 2 is a block diagram to show an embodiment of the control system of this invention.

FIG. 2 shows the control system thereof. A CPU (Central Processing Unit) 40 which controls the whole system is connected to a ROM (Read Only Memory) 41 and a RAM (Ramdom Access Memory) 42 via a system bus CB as well as to a conveying control section 43 which controls the conveying mechanisms 3 and 10. Image signals PS are inputted and stored in buffer memories 46Y, 46M and 46C for each of the colors Y, M and C via an input interface 48. These buffer memories 46Y, 46M and 46C are controlled respectively by a memory controlling section 44 while the input interface 43 and the memory controlling section 44 are controlled by the CPU 40. The system bus CB is connected to a light source control section 45 which ON-OFF controls the light sources 34 through 36 in the units 31 through 33. The CPU 40 further controls thermal head controlling sections 47Y, 47M and 47C so as to supply predetermined signals to thermal heads 21, 22 and 23 based on the data stored in the buffer memories 46Y, 46M and 46C.

Figure 3:
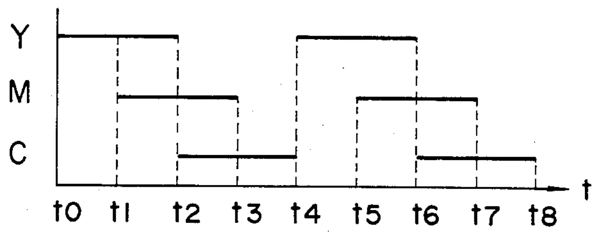
FIG. 3 is a timing chart to show examples of operation thereof.

The heat-sensitive recording material 1 comprises diazo compound(s) and thermal coloring elements including a coupling agent provided on an aforementioned type substrate in a manner that the thermal coloring elements are developed to colors when heated at the same or different plural temperature(s) and the diazo compound is decomposed by light beams of different wavelengths. The image signals PS are color-separated via the input interface 48 and accumulated in the buffer memories 46Y, 46M and 46C corresponding respectively to each color via the memory controlling section 44. The CPU 40 controls taking out the heat-sensitive recording material 1 one sheet at a time from the stocker 2 via the conveying control section 43, the conveying of the same by the conveying mechanism 3 and simultaneously controls the operation of the conveying mechanism 10 which is arranged in parallel to the conveying mechanism 3. In accordance with the conveying movement, the CPU 40 controls the thermal heads 21 through 23 to turn ON/OFF the same as shown in FIG. 3. It also lights the light sources 34 through 36 via the light source control section 45. More specifically, by the time the heat-sensitive recording material 1 arrives at the conveying mechanism 10 or at the time $t_0$, the light sources 34 through 36 are already lit. The thermal head 21 is switched ON at the time $t_0$ so as to record the data in the buffer memory 46Y on the recording material 1A via the thermal head controlling section 47Y. Such recording operation is kept on until the time $t_2$ or when the recording material 1A has completely passed the thermal head 21. Similarly, from the time $t_1$ when the recording material 1A arrives at the thermal head 22, the thermal head 22 is actuated and the data in the buffer memory 46M is recorded on the recording material 1A via the thermal head controlling section 47M. The operation is kept on until the time $t_3$ when the recording material 1A has passed through the thermal head 22. Similarly, recording by the thermal head 23 continues from the time $t_2$ to the time $t_4$ to complete the recording for one sheet of the recording material 1A. As the recording material 1 is conveyed sheet by sheet by the conveying mechanism 3, the recording starts for the next recording material 1A at the time $t_4$ and completes at the time $t_8$ for three colors repeating the recording operations sequentially. The light source control section 45 is already actuated via the CPU 40 by the time the recording operation starts so that the light sources 34 through 36 therein emit light of predetermined weavelengths respectively. The diazo compounds on the recording material 1A which pass beneath the light source units 31 through 33 are decomposed by light beams of different wavelengths. More particularly, when the recording material 1 passes under the light source unit 31, the color of yellow Y recorded by the thermal head 21 is decomposed, and when it passes under the source unit 22, the color of cyan C recorded by the thermal head 22 is decomposed. Further, when it passes under the unit 33, the color of magenta M recorded by the thermal head 23 is decomposed. By the time the heat-sensitive recording material has passed through the conveying mechanism 10, all the three colors of yellow, magenta, and cyan are decomposed to record the color images on the recording material 1A. In this manner, the sheets of heat-sensitive recording paper which have had color images copied thereon in accordance with the image signals PS are piled one by one in the collecting box 4.

Although the light blocking covers 31*a* through 33*a* of the light source units in the above embodiment are described as being housed in the light blocking covers, the covers may be made of a so-called light filtering material (hereinafter referred to as a light filtering material) which absorbs at least 50% of the light which decomposes at least one diazo compound contained in the recording material and transmits more than 50% of the remaining visible light. The light source unit may include a light reflecting plate which may be flat or curved, or in combination of the two forms. A light reflecting plate may be be provided underneath the recording paper. The conveying route at the portion which emits light on the recording paper may be curved at the center. The light source unit may be provided not only on the recording side of the recording paper but also on the opposite side thereof or both. A lens system may be provided between the light source and the recording paper for condensing light.

The light sources are preferably cooled by air or by water or by causing the light source unit to contact with other belts or rollers. The temperature at the cover walls of the light sources or the light source units may be controlled by using heat generation or heat absorption caused by the passage of electric current through the interface of different metals.

A wire member may be suspended between the light source units and the recording material for facilitating smooth travel of the recording material. A light transmissible material may also be provided therebetween. The recording material may conveyed in a manner to repeatedly pass through the area to which light is emitted by the same light source for a plural number of times.

The whole structure of the light sources need not necessarily be covered by the light blocking covers, but light blocking plates or light filtering materials may be provided between the recording section and the sources. The light blocking plate or the light filtering material may be flat or curved, or in the forms of cloth, fibers or rolls or in combination thereof. Anything may be utilized so long as it can prevent the light sources from emitting light beams on the non-recorded material.

As disclosed in Japanese Utility Model Application Laid-open No. 1535 48/1982, the light source unit which decomposes the heat-sensitive recording material may be structured with plural light sources through which the recording paper passes in the form of letter S to encircle each source. A tubular cover of light transmitting property may be provided at each source. Further, the tubular cover may be rotated at a peripheral speed equal to the traveling speed of the recording material. Air may be blown into the cover for cooling the light source. As disclosed in Japanese Utility Model Application Laid-open No. 167849/1982, the light sources, the light source unit or the covers thereof may be structured integrally with the conveying rollers or the feed-out rollers.

Figure 4A:
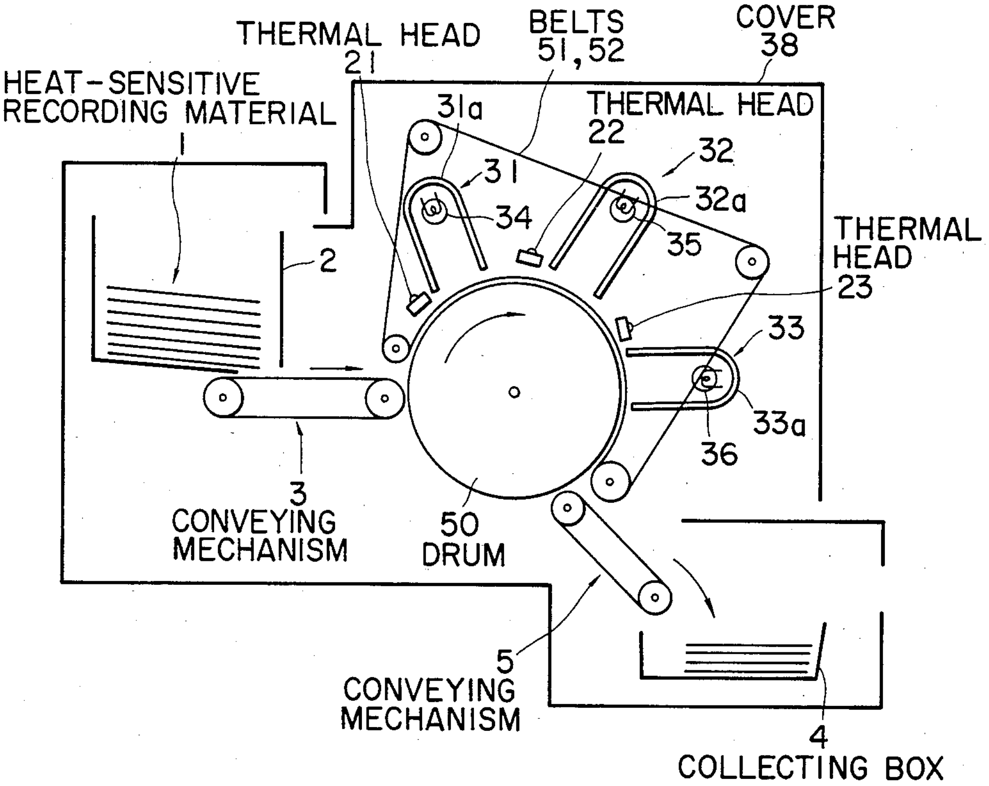
FIG. 4A is a side structural view of another embodiment of this invention.
Figure 4B:
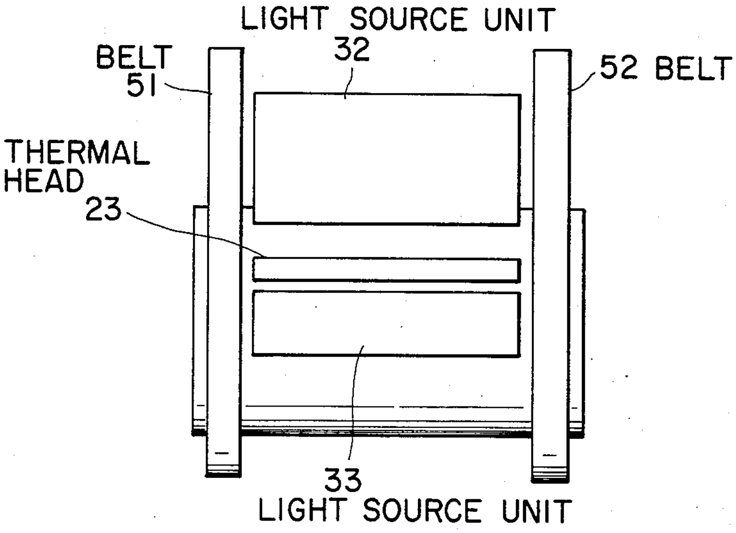
FIG. 4B is a frontal view thereof.

FIGS. 4A and 4B show another embodiment of this invention wherein the heat-sensitive recording material 1 conveyed by the conveying mechanism 3 is transported in an arc on a rotating drum 50. The above mentioned thermal heads 21 through 23 as well as the light source units 31 through 33 are provided along the circumference of the drum 50. The conveying belts 51 and 52 extending around the rollers are placed on both ends of the drum 50 to feed the heat-sensitive recording material 1A between the belts 51 and 52 and the drum 50 and to hold the recording material 1A with pressure therebetween and to convey the same as the drum 50 rotates. Near the ends of the belts 51 and 52 on the drum 50 is provided a conveying mechanism 5 which takes up the thus conveyed recording material and piles the same in a collecting box 4. The thermal heads 21 through 23 and the light source units 34 through 36 are controlled in the same way as the above described embodiment.

In the above embodiment, the thermal coloring element of the color which is recorded last (in this case, cyan C) is separated by the light source unit 33, but the coloring element does not necessarily have to be separated after the last recording. The light source unit 33 need not to be provided.

Although the recording method for the three colors of yellow, magenta and cyan was described in reference to the above embodiment, the number of colors to be recorded is not limited to three; and recording of hard-copies in more than two or four colors is possible.

The heat-sensitive recording material may be in the form of a roll which is cut either before or after recording with a cutter provided at a suitable location. Alternatively, the recording material may be perforated and torn at perforations after it is outputted from the apparatus.

Figure 5A:
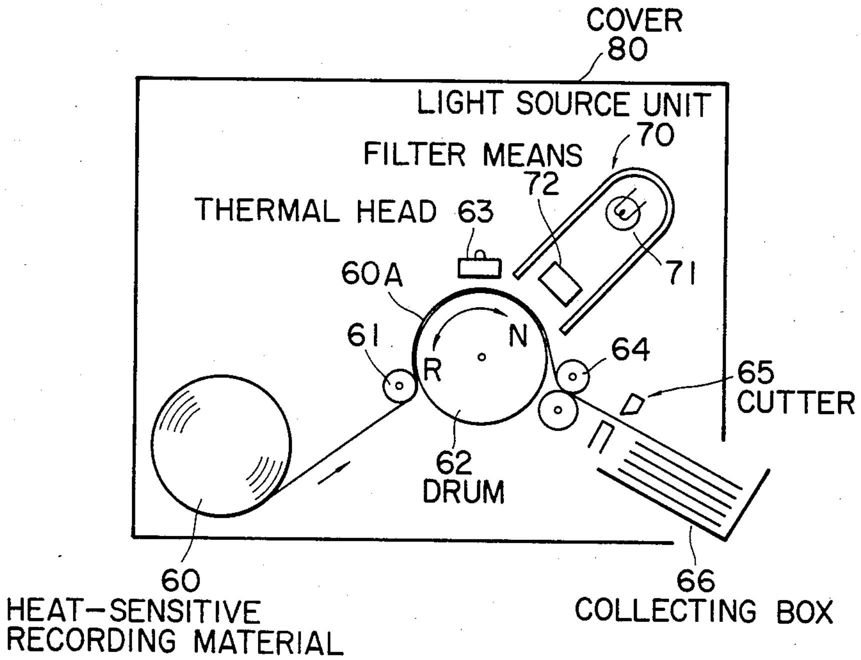
FIG. 5A is a side structural view to show still another embodiment of this invention.
Figure 5B:
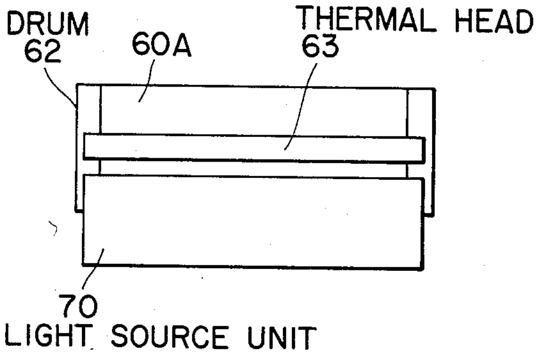
FIG. 5B is a plan structural view seen from the position of a drum.

FIGS. 5A and 5B show still another embodiment of this invention.

Figure 6:
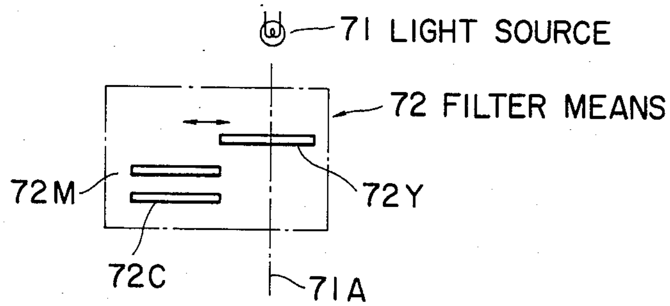
FIG. 6 is a structural view of a filter means used for this invention.

A heat-sensitive recording material 60 in the form of a roll is guided onto a drum 62 by a feed-out roller 61 and conveyed to the recording section. Thus conveyed heat-sensitive recording material 60A passes below a thermal head 63 and a light source unit 70. The thermal head 63 is configured in line parallel to the longitudinal axis of the drum 62. A light source unit 70 is provided downstream of the thermal head 63 to block the outside light. A light source 71 is provided in the light source unit 70 to emit light of a predetermined wavelength while a filter means 72 is provided therebelow to emit light of different wavelengths onto the heat-sensitive recording material 60A. The filter means 72 comprises three filters 72Y, 72M and 72C which generate wavelengths corresponding to the colors yellow (Y), magenta (M) and cyan (C) as shown in FIG. 6 and which are arranged at points offset from the optical axis 71A of the light source 71. When the light of the wavelength corresponding to the color Y is to be directed onto the heat-sensitive recording material 60A, the filter 72Y is adapted to move to a location on the optical axis 71A by a driving mechanism (not shown). A feedout roller 64 is provided at a location further downstream of the light source unit 70 along with a cutter 65 for cutting the recording material 60A to predetermined lengths. The cut pieces of the recording material 65 are piled in a collecting box 66 provided therebelow.

The drum 62 is rotatively driven either in the direction N or R. The heat-sensitive recording material 60A which is guided onto the drum 62 closely adheres to the surface thereof and is rotated either in the direction N or R as the drum 62 rotates. The whole unit is sheathed with a cover 80 for blocking out ultraviolet light which might otherwise decompose the thermal coloring elements on the heat-sensitive recording material 60 and reduce their sensitivity.

Figure 7:
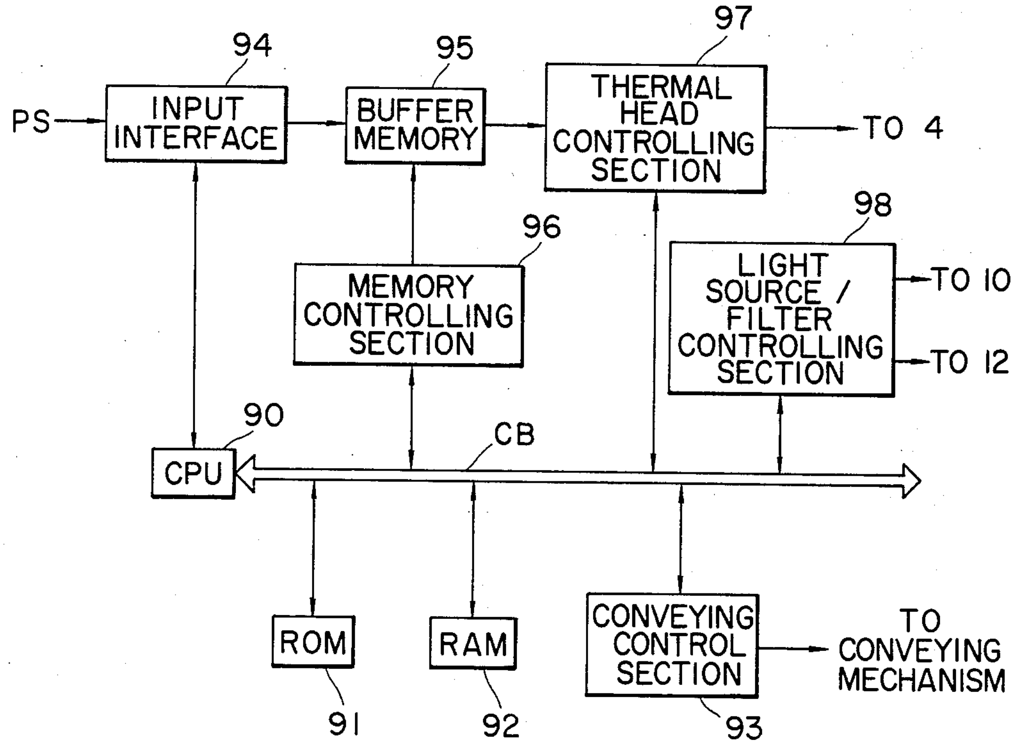
FIG. 7 is a block diagram to show an embodiment of the control system of this invention.

FIG. 7 shows the controlling system thereof wherein a CPU 90 is connected to a ROM 91 and a RAM 92 via a system bus CB as well as to a conveying control section 93 which controls the conveying mechanism such as the drum 62 and the cutter 65. The image signals PS are inputted in a buffer memory 95 via an input interface 94. The buffer memory 95 is controlled by a memory controlling section 96 while the input interface 94 and the memory controlling section 96 are controlled by the CPU 90. The system bus CB is connected to a light source/filter controlling section 98 to ON/OFF control the light source 71 inside the light source unit 70 as well as the position of filters 72Y, 72M and 72C. The CPU 90 further controls the thermal head controlling section 97 in a manner to feed predetermined signals to the thermal head 63 in accordance with the data stored in the buffer memory 95.

Figure 8:
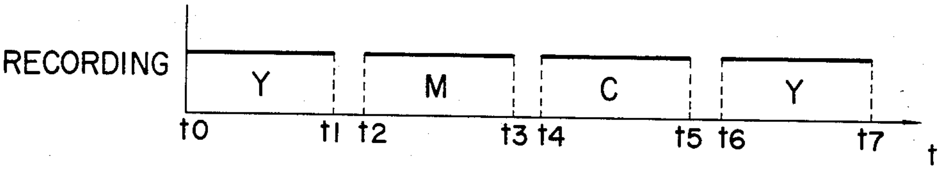
FIG. 8 is a timing chart of the operation thereof.

The heat-sensitive recording material 60 comprises diazo compounds and thermal coloring elements including a coupling component provided on a substrate of the aforementioned type in a manner so that the thermal coloring elements are developed into colors when heated at the same or different temperatures and the diazo compounds are decomposed with plural lights of different wavelengths. The image signals PS are color-separated via the input interface 94 and stored in the buffer memory 95 via the memory controlling section 96. The CPU 90 operates to control the guiding of the heat-sensitive recording material 60 onto the drum 62 via the conveying control section 93, and the conveying of the same to the recording section as the drum 62 rotates in the direction N. It also ON/OFF controls the thermal head 63 and the filter means 72 as the recording material is conveyed as shown in FIG. 8. More particularly, when the recording material 60 arrives at the position of the thermal head 63 by the rotation of the drum 62 at the time $t_0$, the CPU 90 reads out the image signal of Y content which is to be stored in the buffer memory 95 via the thermal head controlling section 97, lights the light source 71 via the light source/filter controlling section 98 and positions the filter 72Y on the optical axis 71A. When the recording material 60A which has been thermally recorded by the thermal head 63 passes below the light source unit 70, the diazo compound is decomposed with the light of the wavelength of the filter 72Y and as a result, the image of the color Y is stored in the recording material 60A. Recording continues for the color Y until the time $t_1$, and at the completion of the recording operation the drum is reversed to move in the direction R, the light source/filter controlling section 98 is controlled to move the filter 72Y to the original position, and the light source 71 is turned OFF. Then, the drum 62 is again driven in the direction N via the conveying control section 93, and when the recording material 60A comes to the position of the thermal head 63 at the time $t_2$, the CPU 90 reads out the image signals of M content from the buffer memory 95 via the thermal head controlling section 97 for recording, lights the light source 71 via the light source/filter controlling section 98 and positions the filter 72M on the optical axis 71A. When the recording material 60A which has been recorded thermally by the thermal head 63 passes beneath the light source unit 70, the diazo compounds thereon are decomposed with the light of the wavelength of the filter 72M and the images of the color M are recorded on the recording material 60A superposed on the images which have already been recorded in the color Y. The recording of the color M continues until the time $t_3$, the restoring operation as described above is completed by the time $t_4$, and the recording of the color C is conducted between the times $t_4$, and $t_5$. By the time $t_5$, images have been recorded in the three colors of Y, M and C so as to reproduce images corresponding to input image signals PS. Upon completion of the recording of images in three colors for one frame (at the time $t_5$), the CPU 90 controls the conveying of the recording material further in the direction N via the conveying control section 93. When a predetermined length of the recording material has been conveyed, the CPU 90 controls the light source/filter controlling section 98 to cut the recording material 60A with the cutter 65. Cut pieces of the recording material are piled in the collecting box 66 and recording operation resumed at the time $t_6$ for the next frame.

If the coupling temperatures of the coloring elements are identical to each other, all the elements develop colors at the first stage and the color synthesized from those colors is recorded first, then colors of sequentially decomposed color elements are removed.

Figure 9:
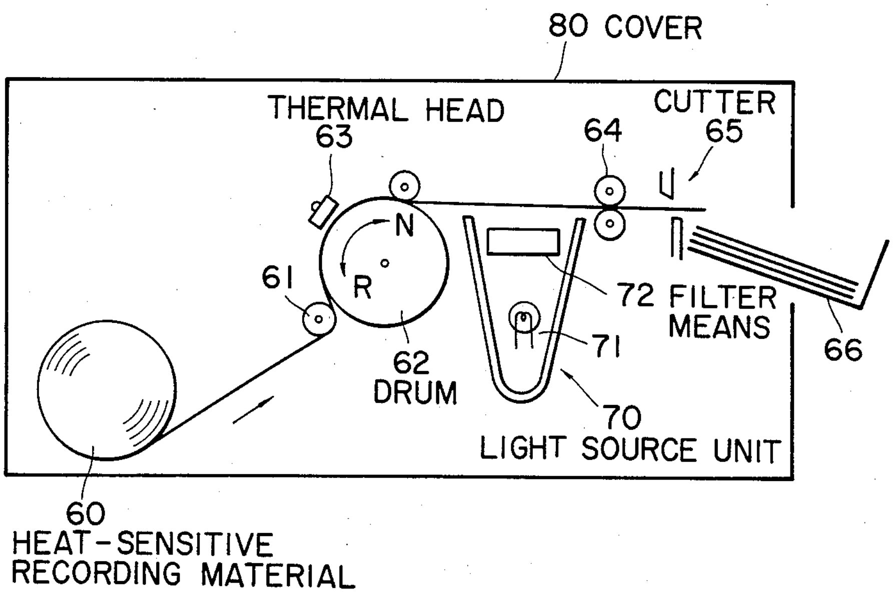
FIG. 9 is a side structural view to show still another embodiment of this invention.

FIG. 9 shows still another embodiment of this invention similar to the embodiment shown in FIG. 5A wherein the heat-sensitive recording material 60 which is conveyed by a drum 62 is linearly transferred to the feed-out roller 64 and a light source unit 70 is provided along the linear traveling route. The thermal head 63 and the light source unit 70 are controlled in a similar manner to that of the above embodiments for image recording.

Although the thermal coloring element of the color which is recorded last (in this case, cyan C) is decomposed with the light from the light source unit 70, decomposition need not to be conducted after the last recording and therefore the filter 72C may be eliminated. In this case the filter need not to be switched as decomposition is conducted for only one color in the case of two color recording.

According to the thermal recording apparatus of this invention, the heat-sensitive recording material comprises diazo compounds and thermal coloring elements including a coupling content on a substrate in a manner that the thermal coloring elements are developed into colors when heated at one or plural different temperature(s), and the diazo compounds are decomposed with plural electromagnetic lines of different wavelengths. The recording material can have recorded thereon hard copies of color images by the above apparatus.

Figure 10:
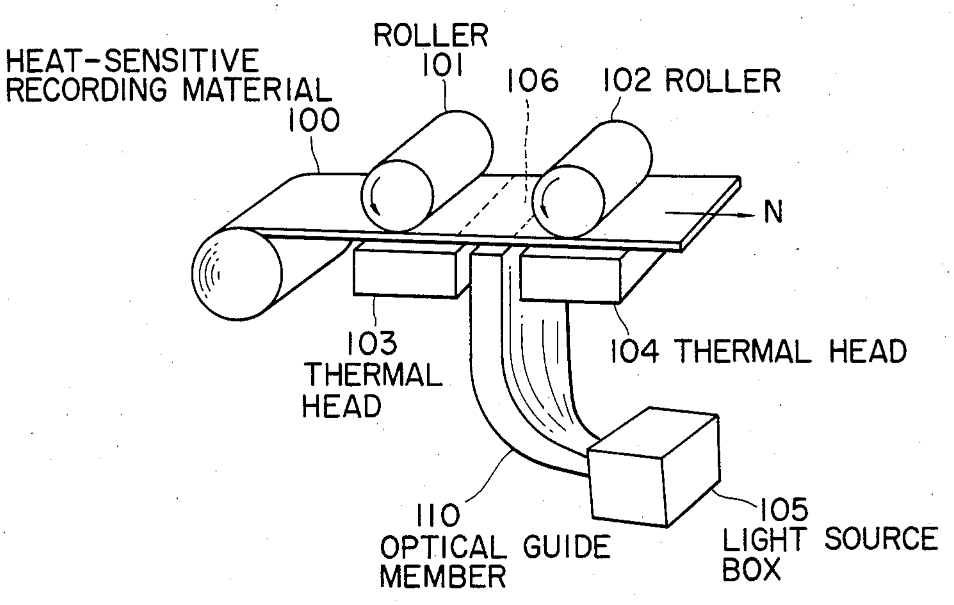
FIG. 10 is a structural view to show an embodiment of recording/fixing section according to this invention.
Figure 11:
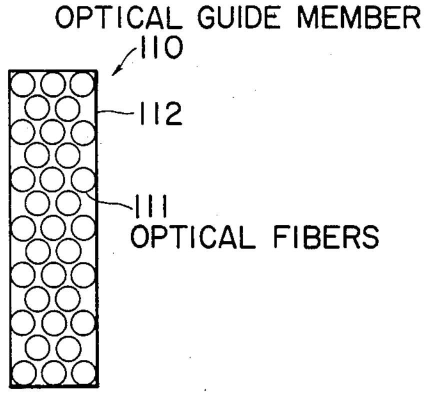
FIG. 11 is a structural view to show an embodiment of a first guiding member used for this invention.

The thermal recording apparatus described above requires a considerable space between thermal heads because a light source unit is provided in the light emitting zone between thermal heads, inevitably making the apparatus large in size or requiring much time for conveyance of the heat-sensitive recording material and requiring a longer recording time. The embodiment shown in FIG. 10 solves such a problem with a novel structure. A heat-sensitive recording material 100 is conveyed in the direction N by the conveying rollers 101 and 102 and thermal heads 103 and 104 are respectively provided below the conveying rollers 101 and 102 which heat the heat-sensitive recording material 100 at the same or different temperature(s) for color-developing and recording. A light emitting zone 106 is provided between the thermal heads 103 and 104. Light of predetermined wavelength is emitted from a light source box 105 including the light source as described above and transmitted via an optical guide member 110 to decompose and fix the thermal coloring elements which have been recorded thereon. The optical guide member 110 comprises a large number of optical fibers 111 bundled inside a guide member 112 of rectangular cross section as shown in FIG. 11, and may be an arbitrary member so long as the light from the light source box 105 can be transmitted to the light emitting zone 106 for illumination.

The above structure allows positioning of the light source box 105 at a location away from the light emitting zone 106 as well as transmission of the light by the optical guide member 110 for illumination so that the interval between thermal heads 103 and 104 can be reduced. This makes the size of the apparatus smaller, and the time needed to carry the recording material 100 from one thermal head 103 to the other 104 shorter, thereby remarkably enhancing the recording speed of the whole system for multiple color recording.

Figure 12:
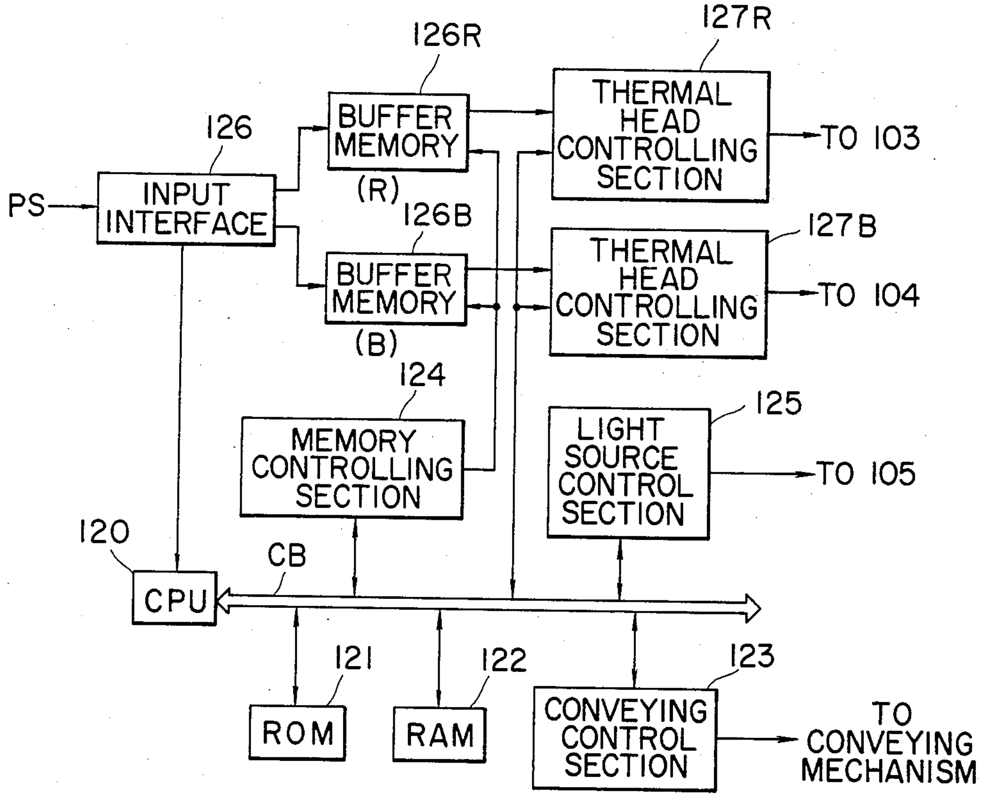
FIG. 12 is a block diagram to show an embodiment of the control system of this invention.

FIG. 12 shows the controlling system of the apparatus wherein a CPU 120 which controls the whole system is connected to a ROM 121 and a RAM 122 via a system bus CB as well as to a conveying control section 123 which controls the conveying mechanism. The image signals PS are inputted in buffer memories 126R and 126B for the colors R and B (red and blue) via an input interface 126. These buffer memories 126R and 126B are respectively controlled by a memory controlling section 124 while the input interface 126 and the memory controlling section 124 are controlled by the CPU 120. The system bus CB is connected to a light source control section 125 to control the light source within the box 105. The CPU 120 further controls the thermal head controlling sections 127R and 127B to send predetermined signals respectively to the thermal heads 103 and 104 based upon the data stored in buffer memories 126R and 126B.

The heat-sensitive recording material 100 used in this construction comprises diazo compounds and thermal coloring elements having a coupling agent on a substrate as described above so that the thermal coloring elements develop colors when heated at either the same or different temperatures and the diazo compounds are decomposed with plural light beams having different wavelengths. The image signals PS are color-separated via the input interface 126 and stored in the buffer memories 126R and 126B of the corresponding colors R and B via the memory controlling section 124. The CPU 120 controls the conveyance of the heat-sensitive recording material 100 via the conveying control section 123 as well as the thermal heads 103 and 104 in accordance with the conveyance thereof. By the time the recording operation is started, the light source control section 125 has already been actuated by the CPU 120 so that the light source provided in the light source box 105 is emitting light of a predetermined wavelength across the light emitting zone 106 via the optical guide member 110. As a result, the thermal recording material which passes through the light emitting zone 106 is illuminated and the diazo compounds thereon are decomposed with the light beams of different wavelengths.

In the above described embodiment, a compact apparatus can copy color images on hard-copies at a high speed onto the heat-sensitive recording material having diazo compounds and thermal coloring elements comprising a coupling agent on a substrate in a manner that thermal coloring elements develop colors when heated at a temperature of either the same or different temperatures and the diazo compounds are decomposed with plural different electro-magnetic rays of different wavelengths.

In the above described embodiment after the thermal coloring elements have developed colors with the thermal head 104 and recording has been conducted, no steps are taken to decompose and fix such thermal coloring elements with light emission. A light emitting mechanism similar to the light source box 105 and the optical guide member 110 may be provided at a location downstream of the thermal head 104 for decomposition and fixation of the elements. The recording method for recording in two colors is described above, but the number of colors which can be recorded is not limited to three and recording of more than three colors is possible.

Figure 13A:
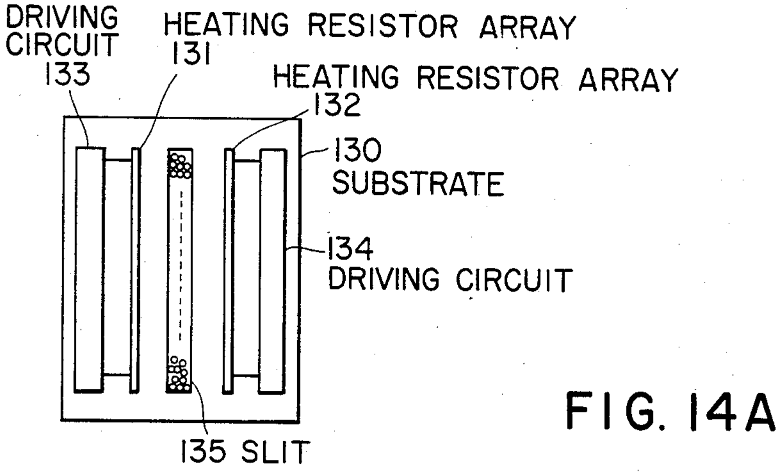
FIGS. 13A and 13B are a plan view and a side view respectively to show an embodiment of this invention.
Figure 13B:
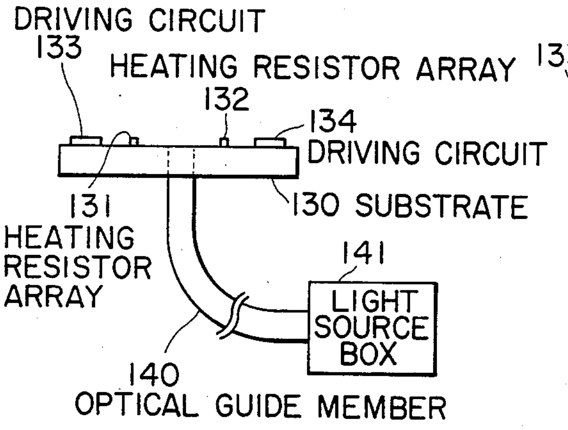

FIGS. 13A and 13B show a thermal head suitable for such thermal recording and fixation. Two heating resistor arrays 131 and 132 are arranged in parallel on a plate-like substrate 130. The heating resistor arrays 131 and 132 are respectively heated at the same or different temperatures by driving circuits 133 and 134 which comprise ICs arranged nearby to develop colors of the thermal coloring elements on the recording material. An elongated slit 135 is cut between the heating resistor arrays 131 and 132, and one end of an optical guide member 140 is embeded in the slit 135 while the other end of the optical guide member 140 is connected to a light source box 141 housing the aforementioned type light source.

The arrangement of thermal heads opposite to the heat-sensitive recording material allows recording of the type described above. More particularly, the recording material is heated at the temperature $T_1$ by the heating resistor array 131 to develop the color of the dye $d_1$, is illuminated with light emitted from the optical guide member 140 to inactivate the dye $d_1$, and is heated again at the temperature $T_2$ ($\geqq T_1$) by the heating resistor array 132 to develop color of the dye $d_2$. The use of this type of recording head allows positioning of the light source box 141 at a location apart from the emitting position. It also allows the transmission of light by the optical guide member 140 for emission to thereby reduce the distance between the heating resistor arrays 131 and 132. The size of the head can therefore be reduced remarkably, the time required for carrying the recording material from one array 131 to the other 132 shortened, and as a whole the recording speed for the multi-color recording can be enhanced greatly. The controlling system shown in FIG. 12 is applicable to the above system.

Figure 14A:
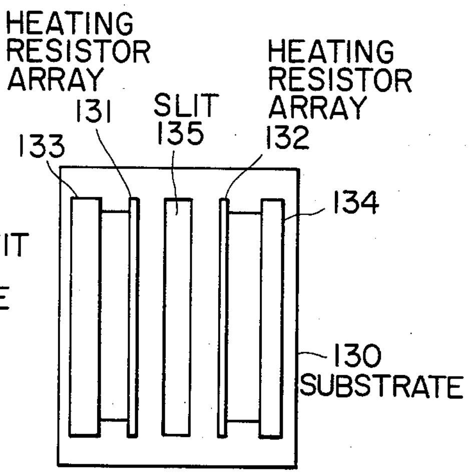
FIGS. 14A and 14B are a plan view and a side view respectively to show still another embodiment of the recording head according to this invention.
Figure 14B:
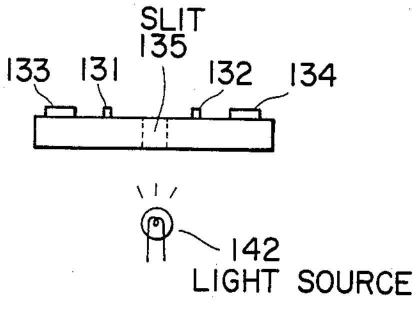

Although the number of heating resistor arrays is two and that of the colors used in recording is two in the embodiment referred to in conjunction with FIG. 13, the number of heating resistor arrays and colors may be three or more. The shape of the substrate 130 and the slit 135 may be determined arbitrarily. For example, as shown in FIGS. 14A and 14B, the slit 135 may be a hole or filled with a transparent member so as to allow illumination with the light from the light source 142. Although no steps are taken in the aforementioned embodiment after the thermal coloring elements are developed and recorded, a light emitting mechanism similar to the light source box 141 and the optical guide member 140 may be provided at a location downstream of the resistance heating resistor array 132 for decomposition and fixation of the coloring elements.

The above described thermal head according to this invention enables recording with a smaller size and simple structure, permitting recording at lower cost and a higher speed.

Figure 15A:
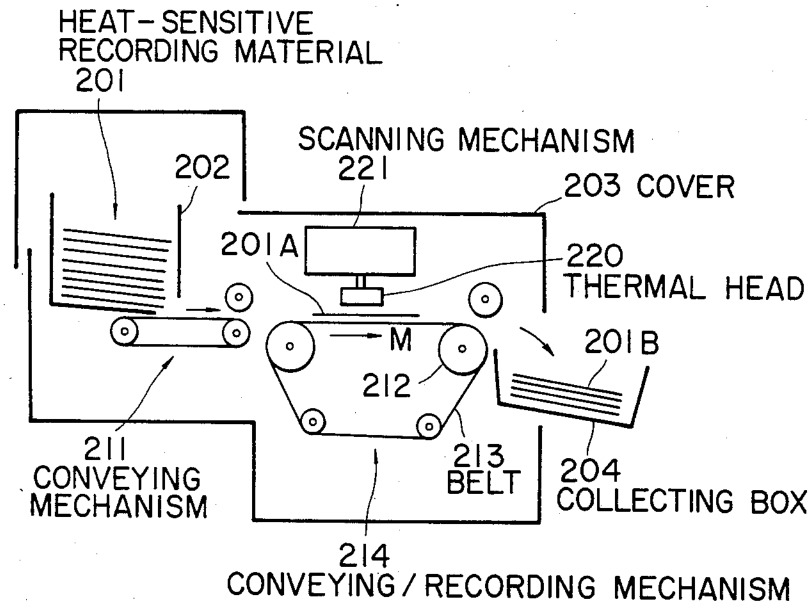
FIG. 15A is a side structural view to show still another embodiment of this invention.
Figure 15B:
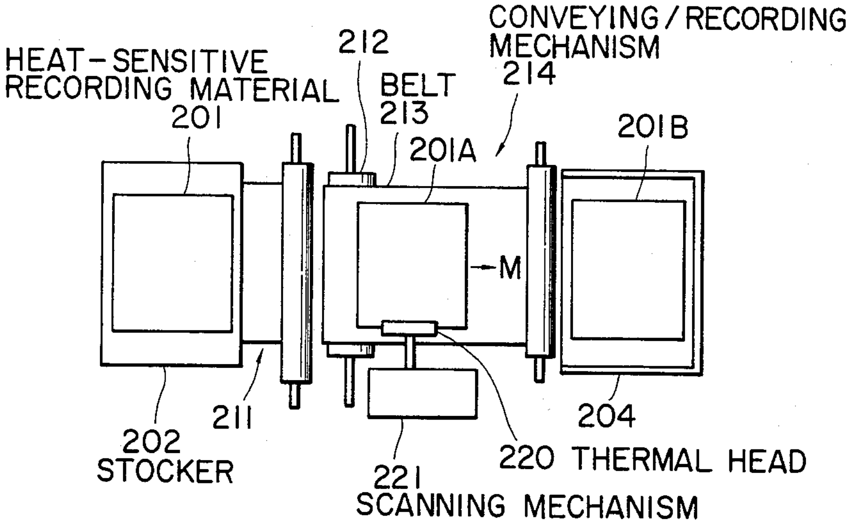
FIG. 15B is a plane structural view thereof.

Color images are recorded on the aforementioned heat-sensitive recording material by the recording apparatus shown in FIGS. 15A and 15B in this invention. More specifically, the heat-sensitive recording material 201 which has been cut in predetermined lengths is piled in a stocker 202, and taken out from the bottom of the stocker 202 one sheet at a time by a conveying mechanism 211 and conveyed to the recording section as a recording material 201A. It is assumed in this embodiment that the recording material 201A comprises the thermal coloring elements of red and blue, the color red (R) being developed at a temperature lower than that of the color blue (B), the color red (R) and the color blue (B) being decomposed in different wavelength zones. The heat-sensitive recording material 201A thus conveyed has images recorded in color by a conveying/recording mechanism 214 comprising a belt 213 suspended on plural rollers 212. It is then conveyed to the collecting box 204. The conveying part of mechanism 214 also comprises the conveying mechanism 211. A thermal head 220 which is to be described hereinbelow is provided above the conveying/recording mechanism 214. The thermal head 220 is adapted to be moved by a scanning mechanism 221 in the direction prependicular to the conveying direction of the heat-sensitive recording material 201A. The whole apparatus is covered with a cover 203 for blocking light.

Figure 16:
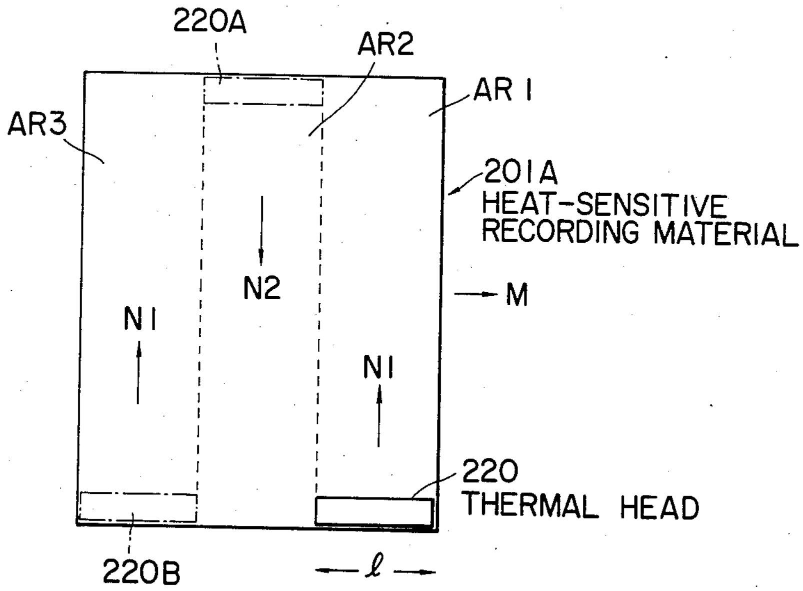
FIG. 16 is a view to show the scanning relation between this invention thermal head and a thermal recording material.
Figure 17A:
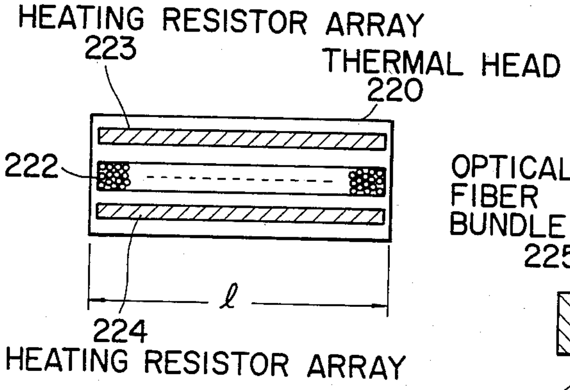
FIG. 17A is a plan view to show an embodiment of the thermal head used in this invention.
Figure 17B:
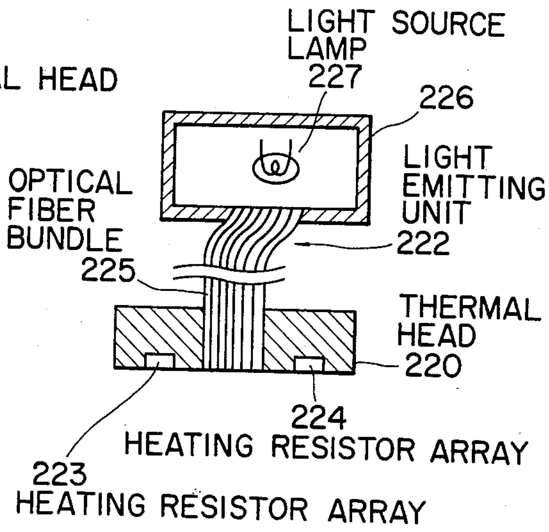
FIG. 17B is a side cross section thereof.

FIG. 16 shows the positional relation of the heat-sensitive recording material 201A on the belt 213 of the conveying/recording mechanism 214 and the thermal head 220 wherein the recording material 201A is conveyed by the conveying/recording mechanism 214 in the direction M, and the elongated thermal head 220 has a length l, and is conveyed by the scanning mechanism 221 in the direction N1 or N2. The thermal head 220 has the elongated shape as shown in FIGS. 17A and 17B, is provided with two heating resistor arrays 223 and 224 arranged in the longitudinal direction and with optical fiber bundle 225 having a rectangular cross section, and a light emitting unit 222 is provided to guide the light from the light source lamp 227 in the box 226 and illuminate the heat-sensitive recording material 201A for decomposition of the element of the color red. A light source such as a light emitting diode may be provided within the thermal head in the rectangular shape as the above mentioned unit. The heating resistor arrays 223 and 224 are heated to different temperatures determined by the types of the heat-sensitive recording materials for recording in two different colors of red and blue.

Figure 18:
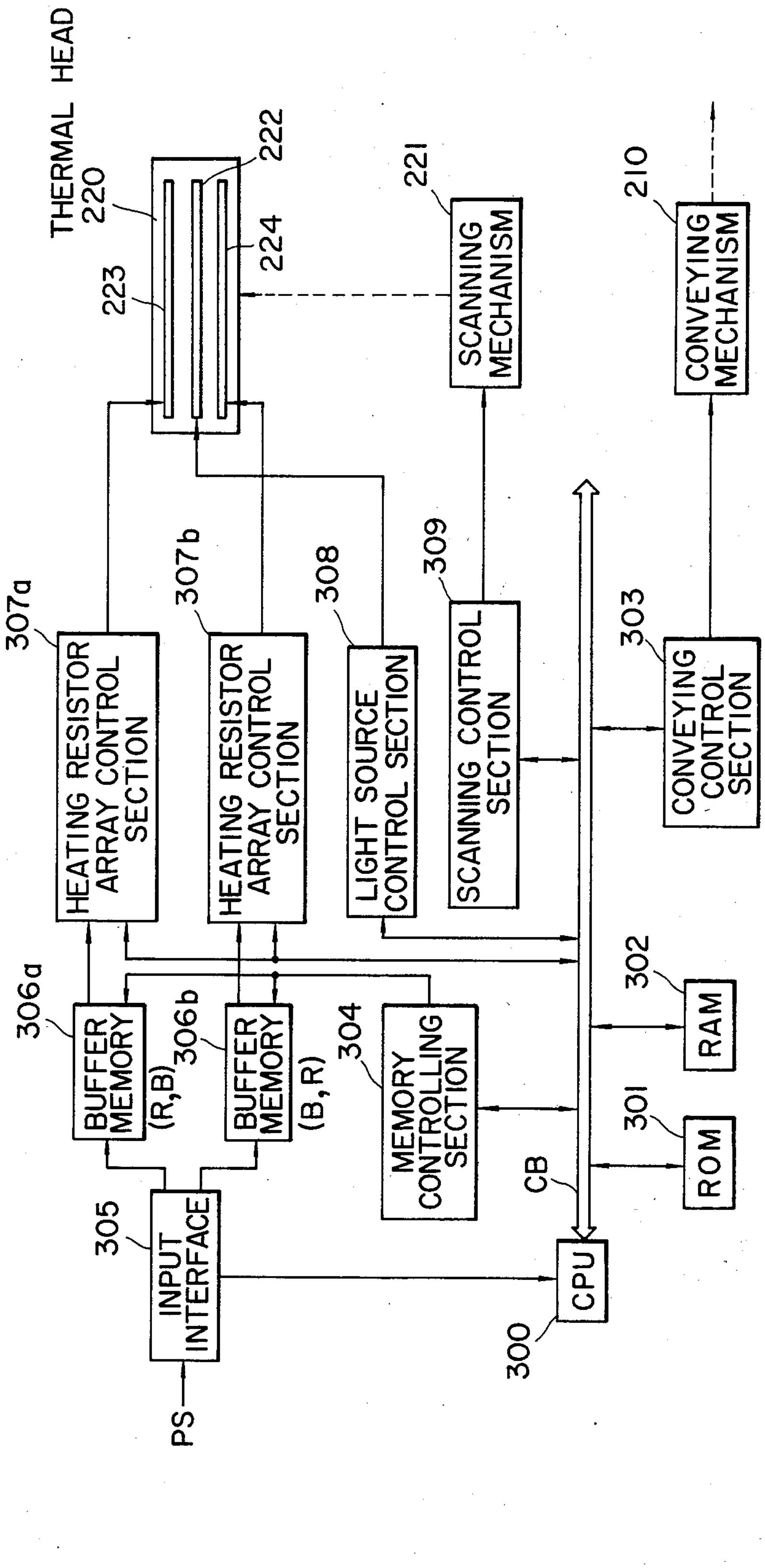
FIG. 18 is a block diagram to show the control system of this invention.

FIG. 18 shows the controlling system of this invention heat-sensitive recording material wherein a CPU 300 is connected to a ROM 301 and a RAM 302 via a system bus CS as well as to a conveying control 303 and a scanning control section 309 for controlling a conveying mechanism 210 and a scanning mechanism 221. The image signals PS are inputted and stored in buffer memories **306*a* and 306*b* via an input interface 305 in a manner that the red (R) and the blue (B) signals alternate by one line. These buffer memories 306*a* and 306*b* are controlled respectively by a memory controlling section 304 while the input interface 305 and the memory controlling section 304 are controlled by the CPU 300. The system bus CB is connected to a light source control section 308 to control ON/OFF of the light source 222 within a thermal head 220. The CPU 300 further controls the heating resistor array control sections 307*a* and 307*b* to send predetermined signals to the heating resistor arrays 223 and 224 based upon the data stored in buffer memories 306*a* and 306*b***.

The operation of the aforementioned structure will now be described referring to the timing charts in FIGS. 19A through 19C.

The heat-sensitive recording material 201 is conveyed from the stocker 202 by the conveying mechanism 210. This conveying operation is suspended at the tinme when the recording material 201 comes to a location having the positional relation to the thermal head 220 as shown in solid lines according to FIG. 16. By this time, the image signals PS have already been separated in color and stored in the buffer memories **306*a* and 306*b* in a manner that the red and the blue signals alternate by one line. From this condition (the time point $t_1$) the heating resistor array 223 is actuated via the array control section 307*a*, respective coloring elements are controlled to be in a low temperature zone with red image signals. The light source 222 is simultaneously actuated via the light source control section 308, the thermal head 220 is moved in the direction $N_1$ by the scanning mechanism 221 and then the heating resistor array 224 is actuated via the array control section 307***b*. For the blue image signals, respective heating resistor arrays 223 and 224 are controlled to be in a high temperature zone. By continuing this operation until the time point $t_2$, the color images of one line can be recorded in the region $AR_1$ of the recording material 201A as shown in FIG. 16. By this time the thermal head 220 has reached the other end of the recording material 201A, and during the period from this time point $t_2$ to the time point $t_3$ the recording material 201A is moved by the conveying mechanism 210 by the distance l in the direction M as shown in FIG. 19B. The thermal head 220 thus arrives at the position 220A in FIG. 16. From this time point $t_3$, as shown in FIG. 19C, the heating resistor array 224 is turned ON by the array control section 307*b* to be in the lower temperature zone for the red image signals while the light source control section 308 turns ON the light source 222 as well as moves the thermal head 220 in the direction $N_2$ to control the respective heating resistor array to be in the higher temperature zone for the blue image signals. By continuing this operation until the time $t_4$, the color images of next one line can be recorded on the region $AR_2$ of the recording material 201A. During the period from the time point $t_4$ to $t_5$, the recording material 201A is moved by the distance l in the direction M. Then by scanning the thermal head 220 in the direction $N_1$ in a manner similar to that for the region $AR_1$, color images can be recorded on the region $AR_3$.

By repeating the aforementioned operations, color images can be recorded over the recording material 201A and the recorded material is conveyed by the conveying mechanism 210 and piled in the box 204.

Although description is given for the recording for heat-sensitive recording material having two thermal coloring elements of different temperature zones in the above embodiment, the coloring elements may have the same temperature zone simply by controlling the heating temperatures of the thermal heads to be identical to each other. In such a case, the coloring elements of two colors develop colors simultaneously at the initial stage and then are recorded in colors minus the color which is thermally developed. Although two heating resistor arrays 223 and 224 are provided to scan and record in two colors in one direction in the above embodiment, it is possible to arrange only one array 223 for conducting image recording of red color by scanning in the direction $N_1$, and conducting image recording of blue color by scanning in the direction $N_2$ to complete one line by one reciprocal scanning. The heat-sensitive recording material 201A is conveyed by one line after this reciprocal scanning and the light source may be lit only for one directional scanning or for both way scanning.

Although in the aforementioned embodiment, description is given for the recording method in two colors or R and B, the number of colors to be recorded is not limited. It is possible to record hard copies in colors of three or more. If the recording in three colors is to be conducted by one directional scanning, the thermal heads comprise three heating resistor arrays 323, 324 and 325 as shown in FIG. 20 and optical fiber bundles 326 and 327 having rectangular sections provided therebetween. The light from the light source lamps 329 and 330 in the light blocking box 328 is guided thereby. Filters 331 and 332 which transmit lights of different wavelengths are provided between the lamps 329 and 330 and the optical fiber bundles 326 and 327 in a manner to freely move between optical fiber terminals 326 and 327, respectively. As shown in FIG. 16, the colors to be recorded by the arrays 323 and 325 respectively change depending on the scanning direction $N_1$ or $N_2$ referred to in conjunction with FIG. 16. Then, filters 331 and 332 are switched in accordance with the scanning directions so that color developing elements for light decomposition are arranged in the order of recording. The mechanism for conveying the heat-sensitive recording material is not limited to these embodiments. It should be understood that many modifications and adaptations of the invention will become apparent to those skilled in the art and it is intended to encompass such obvious modifications and changes in the scope of the claims appended hereto.

What is claimed is:

1. A thermal recording apparatus for recording images in multiple colors on a heat-sensitive recording material having a substrate provided with at least two types of thermal coloring elements thereon constituted by diazo compounds and coupling components which are respectively developable at different temperatures to produce different colors, said apparatus comprising:

a conveying means for conveying said heat-sensitive recording material;

at least two thermal recording heads positioned at points spaced along said conveying means;

means for controlling the temperatures of said thermal recording heads to respective temperatures for activating portions of said thermal coloring elements corresponding to images to be recorded on respective coloring elements; and a light source means between said thermal recording heads for emitting light with a wavelength for decomposing the diazo compound of the thermal coloring element activated by the thermal head which is upstream of said light source means, whereby one thermal coloring element is subjected first to thermal recording by said upstream thermal head and then the unactivated diazo compound thereof is subjected to decomposition by the light from said light source means, and thereby images in colors obtained by thermally activating the respective thermal coloring elements are obtained.

2. The thermal recording apparatus as claimed in claim 1 wherein said diazo compounds are contained in micro-capsules.

3. The thermal recording apparatus as claimed in claim 1 wherein a further light source means is provided downstream of the second thermal head for emitting light with a wavelength for decomposing the diazo compound of the thermal coloring element activated by said second thermal head.

4. The thermal recording apparatus as claimed in claim 1 or 3 wherein said conveying means comprises means for conveying said heat-sensitive recording material in the horizontal direction.

5. The thermal recording apparatus as claimed in claim 1 or 3 wherein said conveying means is a rotating drum.

6. A thermal recording apparatus for recording images in multiple colors on a heat-sensitive recording material having a substrate provided with at least two types of thermal coloring elements thereon constituted by diazo compounds and coupling components which are respectively developable at different temperatures to produce different colors, said apparatus comprising:

a conveying means for conveying said heat-sensitive recording material;

a thermal recording head positioned at a point along said conveying means;

means for controlling the temperature of said thermal recording head to at least two respective temperatures for activating portions of said thermal coloring elements corresponding to images to be recorded on respective coloring elements;

a light source means downstream of said thermal recording head for emitting light with a wavelength for decomposing the diazo compound of the thermal coloring element activated by the thermal head at least at the first of said respective temperatures; and means for driving said conveying means for moving an area of said substrate past said thermal recording head and for controlling said thermal recording head to the first temperature thereof, and then for moving said area past said light source means, and then for moving said area in a direction and for a distance until it is at said thermal recording head and then controlling said thermal recording head to the second temperature, whereby the first thermal coloring element is subjected to thermal recording by said thermal head and then the unactivated diazo compound thereof is subjected to decomposition by the light from said light source means, and then the second coloring element is subjected to thermal recording by said thermal head, and thereby images in colors obtained by thermally activating the respective thermal coloring elements are obtained.

7. The thermal recording apparatus as claimed in claim 6 further comprising filter means forming part of said light source means for selectively switching the wavelength of the light directed onto the heat-sensitive recording material, and said driving means further comprises means for driving said conveyor to move said area to said light source means after said area has been subjected to thermal recording at said second temperature.

8. The thermal recording apparatus as claimed in claim 6 or 7, wherein said conveying means conveys said heat-sensitive recording material in a horizontal direction.

9. The thermal recording apparatus as claimed in claim 6 or 7, wherein said conveying means is a rotating drum.

10. The thermal recording apparatus as claimed in claim 1 or 6, wherein said light source means comprises a light guide having one end adjacent the head and a light source at the other end thereof directing light into said light guide.

11. A thermal recording apparatus for recording images in multiple colors on a heat-sensitive recording material having a substrate provided with at least two types of thermal coloring elements thereon constituted by diazo compounds and coupling components which are respectively developable at different temperatures to produce different colors, said apparatus comprising:

a conveying means for conveying said heat-sensitive recording material;

at least two thermal recording heads positioned at a point along said conveying means;

means for controlling the temperatures of said thermal recording heads to respective temperatures for activating portions of said thermal coloring elements corresponding to images to be recorded on respective coloring elements;

a light source means between said thermal recording heads for emitting light; and means for moving said thermal recording heads and said light source transversely of the direction of conveyance of said heat-sensitive recording medium;

said light source emitting light with a wavelength for decomposing the diazo compound of the thermal coloring element activated by the thermal head which is upstream of said light source means, whereby one thermal coloring element is subjected first to thermal recording by said upstream thermal head and then the unactivated diazo compound thereof is subjected to decomposition by the light from said light source means, and thereby images in colors obtained by thermally activating the respective thermal coloring elements are obtained.

12. The thermal recording apparatus as claimed in claim 11, wherein said thermal recording heads include linear heating resistor member arrays.

* * * * *